G. J. SPOHRER.
TRUCK TIRE PUMP.
APPLICATION FILED JUNE 21, 1920.
1,415,725.
Patented May 9, 1922.
2 SHEETS—SHEET 1.
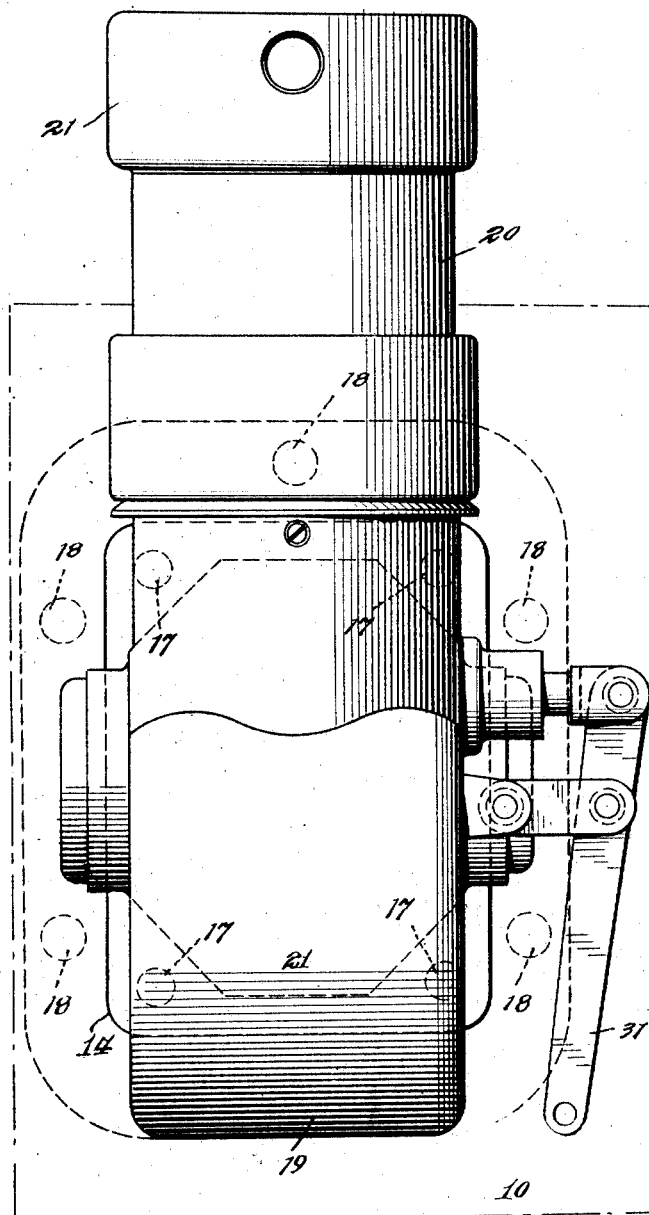
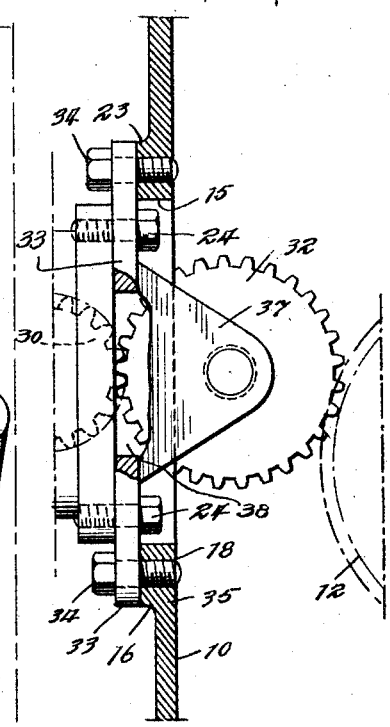
INVENTOR
Gregory J. Spohrer
BY
Warren S. Orton.
ATTORNEYS

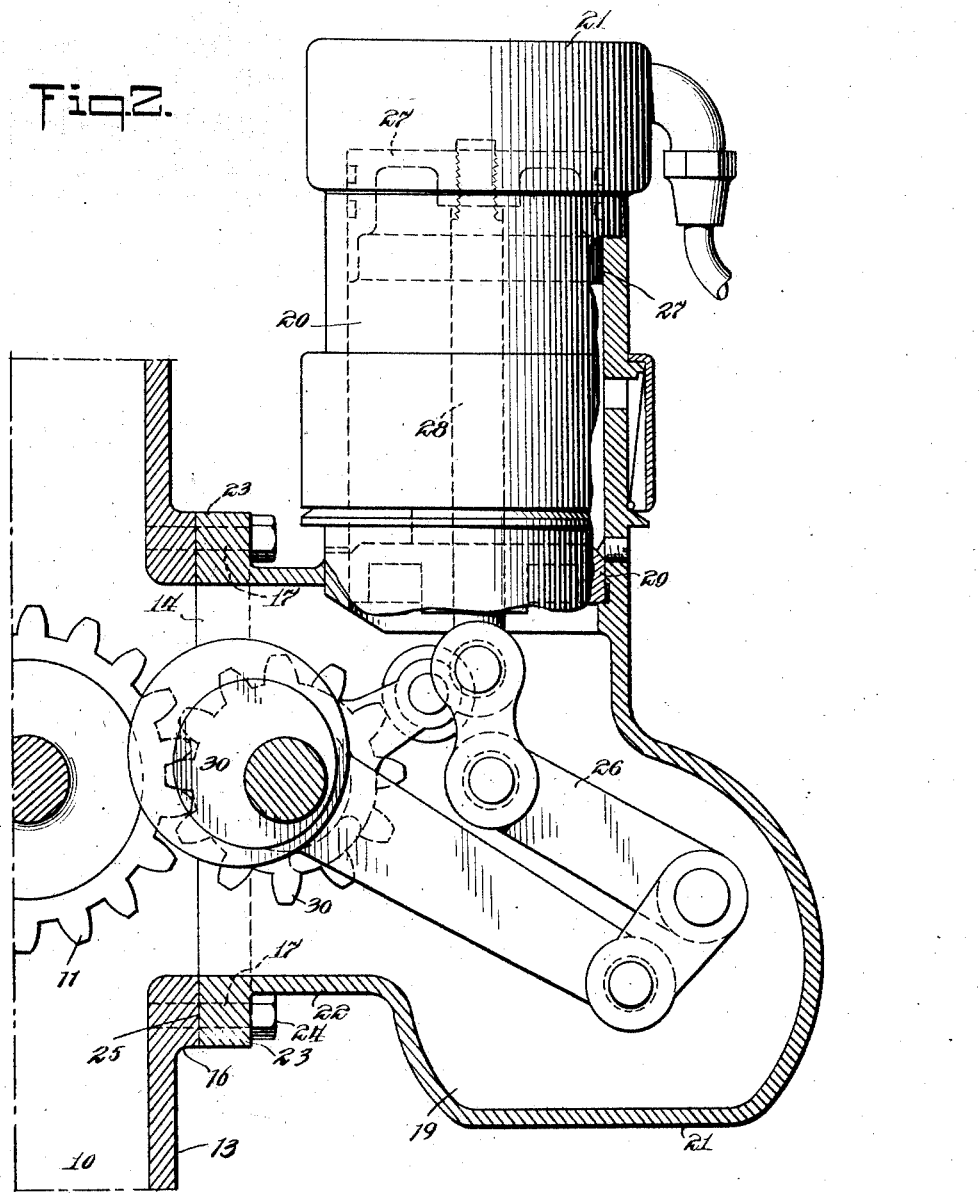

UNITED STATES PATENT OFFICE.

GREGORY J. SPOHRER, OF EAST ORANGE, NEW JERSEY.

TRUCK TIRE PUMP.

1,415,725.  Specification of Letters Patent.  Patented May 9, 1922.

Application filed June 21, 1920. Serial No. 390,335.

*To all whom it may concern:*

Be it known that I, GREGORY J. SPOHRER, a citizen of the United States, and resident of East Orange, in the county of Essex and State of New Jersey, have invented certain new and useful Improvements in Truck Tire Pumps, of which the following is a specification.

The invention relates in general to an air compressor or pump of general application and specifically relates to an improved form of compressor and to the mounting of the compressor.

More definitely defined the invention relates to the organization of a pump of the type designed to be mounted on the transmission casing of the power plant of an automotive vehicle and operatively connected to be driven from the power plant in such casings for supplying a source of pneumatic power or for inflating tires.

It is generally known that the Society of Automotive Engineers has adopted two standard sized openings in the transmission casing and two definitely dimensioned mounting pads for mounting accessories thereon which are intended to be driven from the available power elements in the transmission casing. These pads have been used heretofore for the purpose of mounting relatively small capacity tire pumps coupled in different ways to one or the other of the gears in the transmission casings. In the case of trucks and other vehicles which use large pneumatic tires, correspondingly large capacity pumps are commercially necessary so as to reduce, as far as possible, the time element necessary to inflate the large size tire. However, the designing and the disposition of any such large size pump has presented engineering difficulties, largely due to lack of available space and to interference from extensions on the transmission casing as well as from other structural parts usually found adjacent the transmission casing in conventional forms of automobile constructions.

It has been suggested in the prior art to provide the pump cylinder element of the compressor with a horizontally extending supporting bracket for engaging one of the mounting pads on the transmission casing and for providing, in effect, an over-hanging mounting for positioning the cylinder element in the available space. This construction was not materially objectionable in the case of small pumps except for the massive connecting structure necessary, and for the transmission losses incidental to the driving connections but this construction was practically impossible with the advent of large size and necessarily heavy pumps required to inflate the modern large sized tires and for use in supplying air for other operative purposes.

Among other objections to this suggested over-hang construction it may be noted that there is formed a cantilever effect with a resulting tendency to form a turning torque which was liable to rip the compressor from its mounting. Further, when such a construction was securely mounted on a vehicle travelling at high speed over rough roads, a vibrating movement was set up which racked the mounting construction and reacted on the entire vehicle with disastrous effect.

Accordingly, one of the primary objects of this invention is to provide a compressor which may be of relatively high pumping capacity, which can be mounted directly on the standard forms of mounting pads now prescribed by the automobile engineers and which can be accommodated in the space available in automobile constructions adjacent the part of the transmission casing having the mounting pads.

Broadly, I attain this phase of the invention by forming the compressor to fit in the available space directly in front of either one of the mounting pads and by connecting the compressor to the pad or pads in such a way as will tend to minimize the distance between the supporting pad and the center of mass of the compressor and thus reduce the tendency to develop a disrupting torque action.

For the purpose of accommodating a standard unit form of compressor to the two sizes of mounting pads referred to, the compressor includes an attaching member as an integral part thereof designed to fit the smaller of the pads and also designed to fit a mounting plate constituting an accessory to the compressor per se and which mounting plate is designed to fit the larger of the standard mounting pads.

While the present disclosure features a large capacity pump, space limitations in the situation outlined necessitates the use of a pump which is comparatively undersized for the work required. Any such pump must therefore be run at high speed to discharge the quantity of air required to meet working demands. Any such excessive work is thus liable to cause overheating unless the generated heat is dissipated as rapidly as it is formed.

Accordingly, another object of the invention is to provide a compressor structure of the type outlined, which will be characterized by features which contribute to a rapid absorption and radiation of the heat generated by the compression of the air in the piston chamber of the compressor and preferably to attain this result without providing parts particularly for this purpose.

I attain this phase of the invention by forming the piston cylinder with an integral extension from the heat receiving parts, which extension will provide a relatively large heat dissipating area and at the same time be shaped to provide an enclosing casing for the piston actuating mechanism as well as a conduit for a heat conducting liquid leading therefrom to a large heat absorbing part of the complete organization.

Still another object of the invention and particularly featuring economy in construction is to provide a simple form of device of the class outlined which can be easily manufactured with a relatively small amount of material but with the material so proportioned and distributed in a way such as will mutually brace the parts one from the other, and will minimize any tendency to set up internal fatiguing strains.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a view in elevation of the portion of a transmission casing adjacent the smaller of the standard mounting pads usual in such structures, showing a preferred embodiment of the invention mounted thereon and showing, in ghost lines, the outline of the larger standard mounting pad;

Figure 2 is a vertical sectional view taken centrally axially through a part of the transmission casing and showing part of the cylinder of Figure 1 broken away; and Figure 3 is a detailed view in side elevation of the mounting flange of the compressor shown in the preceding figures together with the mounting or adapting plate for securing the standard size compressor flange to the large size opening and mounting pad shown in ghost lines in Figure 2.

In the following description and in the claims, parts will be identified by specific names for convenience of expression but they are intended to be as generic in their application to similar parts as the art will permit.

In the drawings there is disclosed part of a transmission casing 10 of conventional design which is the usual power plant, one of the transmission gears 11 of which is shown in Figure 2 and another of which, numbered 12, is shown in Figure 3 and both identified hereinafter indifferently as a power element. In the showing in Figure 1, the wall 13 of the casing is provided with a relatively small sized standard opening 14 and in the showing in Figure 3 another wall of the casing is provided with a large sized standard opening 15. In both forms the opening is outlined by a mounting pad 16 provided with four bolt holes 17 in the case of the small pad or six bolt holes 18 in the case of the large size pad.

At present the Society of Automobile Engineers in the United States have adopted for the small or four-hole pads outside dimensions of $4\frac{1}{2}$ by $3\frac{7}{16}$ inches and for the large or six-hole pad outside dimensions of $6\frac{1}{4}$ by $4\frac{1}{2}$ inches. While the invention in its illustrated form is intended to meet these dimensional requirements it is of course to be understood that the disclosure is not specifically limited to any one set of dimensions and will vary with changes in the recommendations of the designing engineers and with changes in practice.

The compressor illustrated follows somewhat along conventional lines and includes largely a one-piece, integral casing 19 comprising a piston cylinder 20 enlarged at its lower end to form a mechanism containing casing 21. This casing is provided on one side with a relatively short hollow extension 22 projecting laterally of the axis of the cylinder to face and to form a continuation of the openings 14 or 15 in the side of the transmission casing. The opening into the casing 21 formed by this extension is outlined by an attaching flange 23 apertured to receive securing bolts 24. The flange 23 constitutes the mounting member of the compressor and is provided on its outer side with a flat, vertically disposed attaching face 25. It is a feature of this disclosure that this securing flange be of standard form on all forms of compressors marketed and that it be fashioned and have its bolt holes positioned to fit over the largest possible available surface on the face of the small size mounting pad as shown in Figure 2. The compressor as a whole is centered in advance of the mounting pad and, as particularly shown in Figure 1, is symmetrically disposed on opposite sides of a medial plane containing the axis of the cylinder and disposed perpendicular to the plane of the attaching face of the mounting pad. The center of mass of the compressor is substantially at the center of figure so as to feature a compact construction and the center of mass is positioned relatively close to the supporting pad so as to minimize torque effect due to the necessary offset mounting as shown in Figure 2. The major portion of the compressor is contained within the projected outlines of the mounting pad and this is particularly true with relation to the large size pad shown in ghost outline in Figure 1.

In automobile constructions such as are herein described, there is usually but limited available space horizontally above the level of the mounting pad on the transmission casing but there is more space below this level. Accordingly, the diameter of the upper or cylinder part of the pump disclosed is made relatively small and is disposed close to the projected plane of the attaching face 25. On the contrary the mechanism containing casing is projected laterally inward for a material distance so as to house an improved form of piston actuating mechanism 26 and to provide a relatively large heat dissipating element or radiator as hereinafter more fully described. The cylinder is provided with a reciprocating piston 27 including a stem 28 which is guided in the cylinder head 29 and attached by link connections to the actuating mechanism 26. This mechanism is in turn driven from a rotary element 30 herein shown to be a gear wheel designed to be operatively connected at will to the power element 11 by means of the actuating control handle 31 when it is desired to couple the compressor with the power system of the automobile.

It is noted in the showing of Figure 2, that the power element 11 is positioned relatively close to the opening and is conveniently available for engagement with the adjacent element 30. In the case of the six-hole openings, however, the most conveniently available power member 12 is positioned some distance inwardly from the corresponding opening 15 and this necessitates the interposition of a supplemental driving connection, such as idle gear 32 to couple the remotely spaced power element in the transmission casing with the compressor mechanism.

For the purpose of mounting the standard size compressor on the six-hole pad and at the same time provide the idler gear necessary to complete the power transmission, there is disclosed in the showing in Figure 3 an attachment which comprises a mounting plate or adapting flange 33 fashioned to fit the large size mounting pad and secured thereto by bolts 34. This mounting plate is provided with apertures 35 which correspond in location to the bolt holes in the flange of the compressor, and the bolts 24 which are supplied with the compressor may be utilized either to fasten the compressor directly to the pad as shown in Figure 2, or to the mounting plate as shown in Figure 3. The mounting plate is provided on its rear face with a pair of brackets 37 between which is pivotally mounted the idler gear 32 which, when in operative position, meshes with the transmission gear 12 and the pump mechanism actuating gear 30. It is understood, of course, that the mounting plate or flange is provided centrally thereof with an opening 38 which contains the contiguous parts of gears 30 and 32.

The openings 14 and 15 are positioned below the normal level of the lubricating liquid in the transmission casing and the action of the several gears in the transmission casing and of the piston actuating mechanism 26 in the casing 21 coact to cause the lubricant to travel through the conduit provided by the two casings. While the piston cylinder is disposed with its axis parallel to the plane of the face 25, obstacles may necessitate an angular disposition of the axis but it is preferable that the axis projected pass centrally through the casing 21 so as to avoid the disadvantages incidental to lateral offsetting of the cylinder from its immediate support.

It is also obviously within the scope of the invention to multiply the number of cylinders included in the organization, one suggested form comprising a balance structure in which another cylinder is disposed in line with the cylinder 20 and on the opposite side of the casing 21.

In operation and assuming that the device is mounted as shown on either of the standard pads and that it is desired to provide a supply of compressed air for inflating the tires, for actuating the starter, or for any other desirable purpose for which a supply of high pressure air is desired, the operator shifts the handle in a direction to cause one or the other of the available power elements in the transmission casing to be coupled with the piston pump actuating mechanism. It is a usual practice to gear the parts so that the piston reciprocates at high speed, and the cylinder and connected parts repeatedly take in charges of air, compress and conduct the same to the parts where the compressed air is to be utilized.

During this rapid pumping the compression end of the cylinder tends to become highly heated and will attain inconvenient if not dangerously high temperature unless means are provided to conduct the heat rapidly away from the cylinder. The integral construction and relatively large mass of the combined cylinder and mechanism containing casing herein disclosed provides a conducting passage for the heat from the points where it is received on the cylinder and a relatively large air cooled exposed radiating surface. The relatively large radiating surface is further subjected to the cooling effect of moving air in case the vehicle is propelled during the pumping operation. The casting of the cylinder integrally with the mechanism containing casing eliminates any joints therebetween which would otherwise act as heat insulating means and tend to retard the free passage of the heat from the hot to the colder portions of the structure. The integral casting illustrated also features an arrangement in which the heat conducting parts increase in radiating area from the cylinder and thus avoid the insulating effect produced by a narrow throat and other connecting parts known heretofore in constructions of this character between the cylinder and the parts connected thereto.

The travelling lubricant acts as a heat conveying medium for transferring the heat from the relatively hot extensions from the cylinder to the relatively cool transmission casing thus taking advantage of the large radiating surface presented by the transmission casing and the metal parts connected thereto. While there is, of course, some resistance to the free passage of heat across the joint between the attaching flange and the mounting pad in the showing in Figure 2 and between the mounting plate and connecting elements in Figure 3 there is nevertheless a material amount of heat transmission from the compressor casing to the transmission casing across this joint, all of which tends to maintain the compressor at a low temperature. Further, the mechanism in the casing 21 tends to splash the lubricant up above its normal level and on to the piston stem and upper relatively hot parts of the casing.

By means of a device of this character it is possible to provide a relatively small dimensioned compressor for installation on the prescribed form and dimensions of pads on transmission casings and at the same time provide an organization of parts which will rapidly and efficiently provide a large supply of high pressure air and to attain this result without deleterious action upon the pump or its associated parts.

Further, a construction is provided which is relatively light compared to the character of work it is required to perform and which can be mounted on vehicles designed for high speed without deleterious effect to the compressor or to the parts carrying the same due to vibratory action of the parts when mounted on a rapidly moving vehicle. The device is capable of being rapidly demounted or assembled and when demounted provides ready access to the interior for cleaning or replacement.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a transmission casing provided with a standard opening and with a mounting pad outlining the opening and disposed in a vertical plane, of an air compressor including a mounting member fashioned to fit on said pad and means for securing the compressor to the transmission casing so as to be supported thereby offset laterally outward in relation thereto, the center of mass of said compressor being substantially at the center of figure thereof and positioned within the laterally projected outlines of the pad and relatively close thereto thereby to minimize any tendency of the compressor to turn relative to the mounting pad under the influence of the torque imposed on the compressor by the cantilever effect of the mounting.

2. In a device of the class described, the combination of a transmission casing having a vertically disposed mounting pad and a transmission gear within the casing adjacent the pad, a compressor including a hollow member coacting with the portion of the casing at the mounting pad to form a pump-actuating-mechanism containing space, actuating mechanism in said space facing the mounting pad, extending therethrough and directly connected to said transmission gear, a piston cylinder carried by said member and having a piston therein operatively connected to be driven by said mechanism and having a reciprocatory movement along the axis of the cylinder which, projected, would pass through said mechanism facing the mounting pad.

3. In a device of the class described, the combination with a casing having a power element therein and having an opening through a vertical side thereof to provide access to said power element, of a compressor including a mechanism containing housing supported directly from the part of the casing at said opening and including driving mechanism confined with its greatest dimension extending vertically, housed therein and projecting therefrom so as to be operatively connected to said power element, said compressor also including a cylinder having a piston mounted therein for reciprocatory movement and coupled to said mechanism to be actuated thereby, one end of said cylinder being in close juxtaposition to the part of the compressor at the opening thereby to minimize the distance between the supporting casing and the adjacent end of the piston cylinder.

4. In a device of the class described, the combination with a casing having a power element therein and having an opening through a vertical side thereof to provide access to said power element, of an air compressor including a mechanism containing casing and a piston cylinder formed integral therewith and disposed with its axis passing through the mechanism containing casing, piston driving mechanism in said compressor adapted to be driven from said power element and means for demountably securing the mechanism containing casing to the first named power element containing casing.

5. In a device of the class described, the combination with a transmission containing casing having an opening through a vertical wall thereof, a mounting pad outlining the opening, and a power element housed within the casing adjacent said opening, of a compact form of compressor comprising in effect a mechanism containing casing having relatively wide horizontal dimensions and a piston cylinder constituting an integral extension projecting therefrom and with the end of the cylinder opening axially into said mechanism containing casing, said mechanism containing casing provided with a vertically extending opening facing the opening in the transmission casing and with an attaching flange outlining the opening for engaging said pad and piston reciprocating mechanism housed in said relatively wide dimensioned part of the mechanism containing casing and with parts projecting through the opening into the transmission casing and actuated from said power element.

6. An air compressor including a one-piece casting constituting a piston cylinder, a mechanism containing casing at one end of the cylinder, said casing provided with an opening through a wall thereof, a flat attaching flange outlining said opening and adapted to constitute part of the means for mounting the compressor in place, said casing extending from the plane of the attaching flange a distance greater than the distance which the cylinder extends from said plane whereby the compressor is shaped to fit in and economically occupy a pre-designed space, piston reciprocating mechanism housed in said relatively large mechanism containing casing and including a rotary element mounted in the casing and projecting exteriorly of the casing through said opening and adapted to receive power from a source external to the compressor.

7. In a device of the class described, the combination with a transmission casing having one of a series of different size mounting pads and a power element within said casing and adjacent said pad, of a standard size air compressor adapted to be mounted on the different size mounting pads, said compressor including a driven mechanism contained within its outlines, said compressor also including an attaching member of a size to fit the smallest of said mounting pads, a flat plate constituting an accessory for accommodating the attaching member to a relatively large size mounting pad, said plate adapted to fit flat against the mounting pad and provided with a bracket projecting from one side thereof and adapted to extend into the transmission casing, and an idler gear carried by the bracket and constituting a driving connection between the power element in the transmission casing and the driven mechanism in the compressor.

8. An air compressor including a piston cylinder enlarged at one end to form a mechanism containing casing, a flanged extension from one side of the casing provided with means for supporting the compressor, said cylinder casing and extension being integrally formed so as to be free of heat insulating joints therebetween, said casing and extension constituting a heat radiator for the cylinder having a relatively large heat discharging area.

9. An air compressor, and cooling means therefor, including a compression cylinder subject to the heat developed under the air compression, a piston operating in said cylinder, said cylinder having an oil-holding radiating casing associated therewith and subject to the heat developed in said cylinder, a container constituting a radiator, said container being in free and open communication with said casing to afford free flow of oil from said casing to said oil container and return, and operating means for said piston disposed in said casing and constituting means to act on the oil in said casing to repeatedly displace the same and cause flow of the oil from said casing to said radiating container for radiating from the container the heat taken up by the oil in said casing.

10. In a device of the class described, the combination with a transmission casing provided with an opening in a wall thereof below the normal lubricant level, of an air compressor constituting an article of manufacture distinct from the transmission casing and having a chamber exposed to the opening in the transmission casing thereby to receive lubricant from the casing, said compressor including a piston cylinder which is liable to become highly heated and connected to the part forming the lubricant containing chamber through means which tend to minimize resistance to heat conduction.

11. In a device of the class described, the combination with a transmission casing provided with an opening in a vertical wall thereof and containing a power member, of an air compressor having a chamber exposed to the opening in the transmission casing thereby to receive lubricant from the casing, said compressor including a piston cylinder which is liable to become highly heated and connected to the part forming the lubricant containing chamber through means which tend to minimize resistance to heat conduction a piston in said piston cylinder and a driving connection between the power member and the piston constituting means for causing the lubricant to circulate through the chamber and transmission casing.

12. In a device of the class described, the combination with a transmission casing having a mounting pad on a side thereof and an opening extending horizontally through the pad, of an air compressor hung from said pad and communicating horizontally through said opening with the interior of the transmission casing, said compressor including a piston cylinder which is liable to become hot, said cylinder having a heat conducting member extending integrally from one end therefrom to form a mechanism containing casing, and means for circulating a heat conducting liquid through the transmission casing and into contact with said integral extension from the piston cylinder.

13. An air compressor including a one-piece integral casting of heat conducting material comprising a piston cylinder having an enlargement at one end thereof to form a piston-driving-mechanism-containing-chamber, said chamber provided on one side with a relatively short hollow extension projecting laterally of the axis of the cylinder and an attaching flange outlining the outer end of the extension.

14. An air compressor and cooling means therefor, including operating means for the compressor, a casing appurtenant to the compressor, an oil container constituting a radiator and in free and open communication with said casing, said operating means being disposed in part in said casing and in part in the opening establishing communication between said casing and said radiating oil container, said operating means constituting also means to displace the oil in the container to cause a movement of the oil from said casing to said container and return.

15. The combination with a transmission case of an air compressor having a casing associated therewith, said casing and said transmission case being in free communication for the flow of oil from one to the other and return and operating means for the compressor extending into said casing and into said transmission case and constituting a means to displace the oil in said casing to thereby induce a movement of the oil repeatedly to and from the transmission case to constitute the latter a radiator for the heat taken up by the oil from the air compressor and its casing.

16. In a compressing and radiating assemblage, an oil container constituting a radiator, a compressor having a casing appurtenant thereto and adapted to contain oil, said radiator container and said casing being in open communication for the free movement of oil from one to the other, and return, said assemblage including movable means acting to induce repeated movements of the oil in the casing and container to cause heat developed in the compressor to be conveyed by the oil to the container to be radiated by the latter.

17. The combination of a transmission case having a standard mounting at one side presenting a pump opening below the usual oil level, and a tire pump secured to said mounting and having an operating crank moving in a path beyond the mounting face and into the transmission case to thereby produce improved cooling and lubricating effects as well as to make possible a large capacity pump in the minimum space.

Signed at New York city in the county of New York and State of New York, this 18th day of June, A. D. 1920.

GREGORY J. SPOHRER.